United States Patent [19]

Mittleman

[11] 4,385,522
[45] May 31, 1983

[54] PIT DEPTH GAUGE

[75] Inventor: John Mittleman, Panama City, Fla.

[73] Assignee: The United States of America as represented by the Secretary of the Navy, Washington, D.C.

[21] Appl. No.: 306,111

[22] Filed: Sep. 28, 1981

[51] Int. Cl.³ .................. G01B 5/28; G01N 29/00
[52] U.S. Cl. .......................... 73/632; 73/105; 73/627; 33/169 B
[58] Field of Search ............ 73/627, 629, 1 DV, 105, 73/644; 33/169 B, 174 P

[56] References Cited

U.S. PATENT DOCUMENTS

| | | | |
|---|---|---|---|
| 3,209,582 | 10/1965 | Greenberg | 73/67.8 |
| 3,237,446 | 3/1966 | Wood | 73/67.9 |
| 3,808,878 | 5/1974 | Dini | 73/67.8 S |
| 3,821,854 | 7/1974 | Koch | 33/169 B |
| 3,936,945 | 2/1976 | Jevremov | 33/169 B |
| 4,107,244 | 8/1978 | Ochiai et al. | 264/30 |
| 4,161,885 | 7/1979 | Sack et al. | 73/597 |
| 4,280,354 | 7/1981 | Wheeler et al. | 73/1 DV |

Primary Examiner—Howard A. Birmiel
Attorney, Agent, or Firm—Robert F. Beers; Harvey A. David

[57] ABSTRACT

A pit depth gauge for use as an accessory to an underwater ultrasonic probe comprises two resiliently biased, freely flooded telescoping members a first of which has a first end wall adapted to ride on a surface to be inspected and a second of which has a second end wall adapted to be connected to the probe with the probe transducer in registration with an acoustic energy port. A stylus is fixed to the second member for axial movement with the transducer toward the first end wall as the stylus enters a pit, whereby the length of an acoustic water path is related to the pit depth.

8 Claims, 3 Drawing Figures

U.S. Patent      May 31, 1983      4,385,522
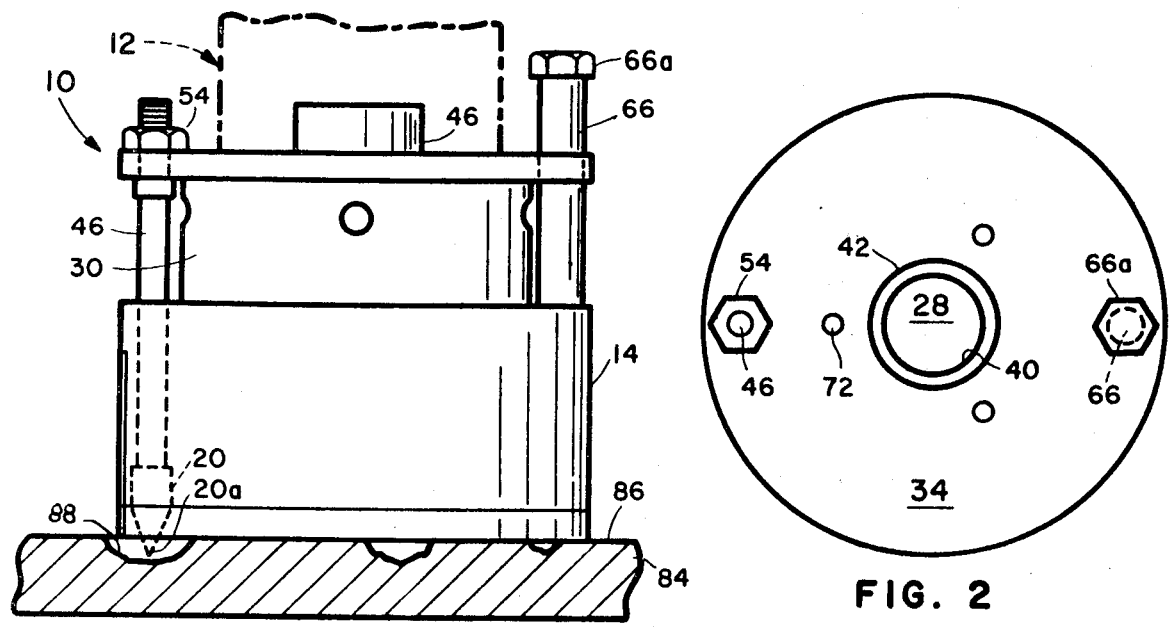
FIG. 1
FIG. 2
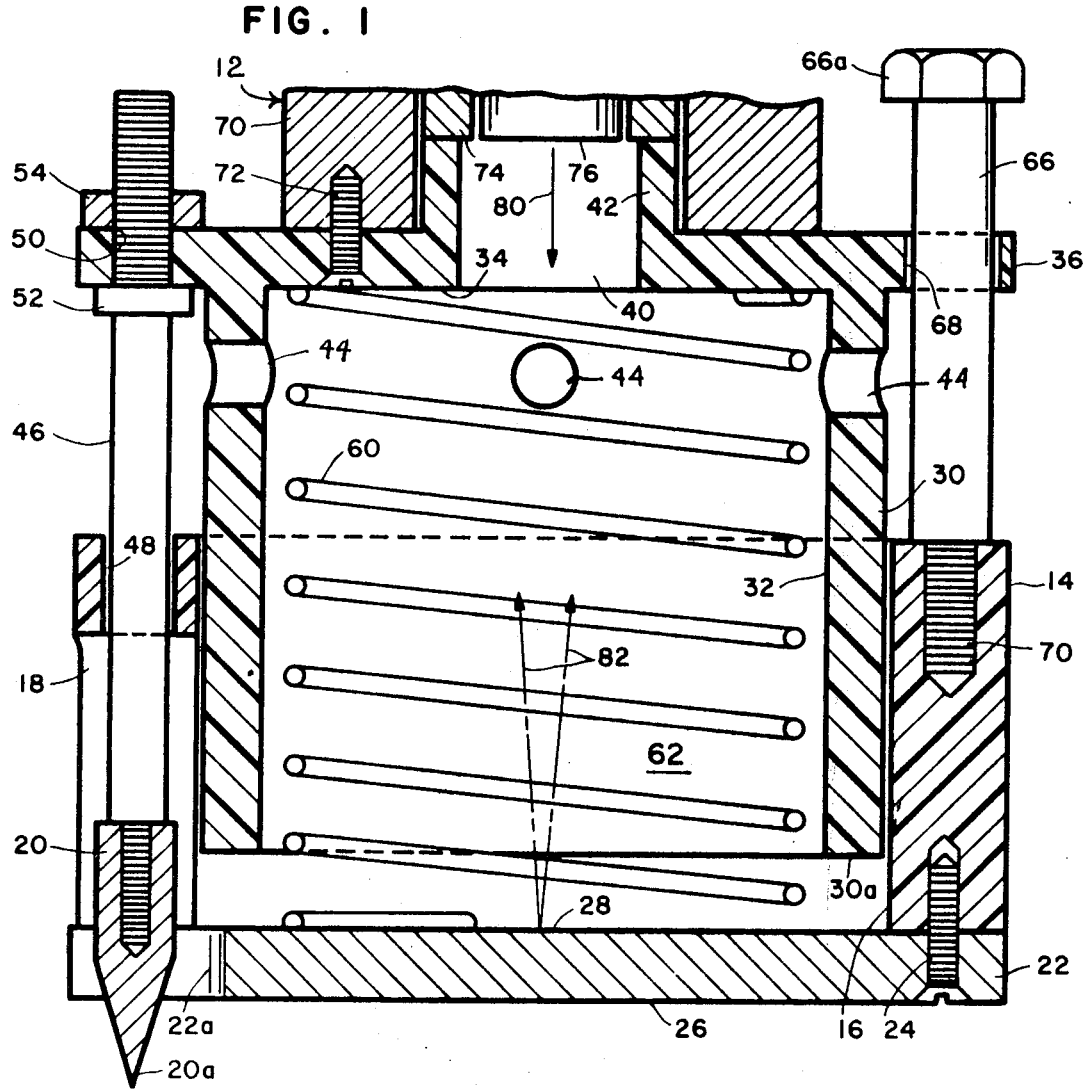
FIG. 3

PIT DEPTH GAUGE

BACKGROUND OF THE INVENTION

This invention relates to the field of ultrasonic inspection, and more particularly to apparatus for carrying out such inspection of the underwater portions of a ship hull or other underwater structure for pitting due to corrosion or the like.

Measuring of corrosion pits is not commonly done underwater because there has been no convenient means for doing so. Rather, a diver usually merely estimates the pit depths visually. More precise measurements can be taken using feeler gauges or by replicating the corroded surface with wax or epoxy compounds. These techniques, however, are time consuming and do not provide a read-out above water except by having the diver carry notes or replicas topside.

Considerable advances have been made in assessment of the condition of thickness of underwater hull plates by a diver hand carried ultrasonic transducer probe that is moved along the underwater surface of a hull plate. The return or reflected signals are recorded topside and provide much meaningful data as to hull condition, most notably hull plate thickness. Pitting of the plates, however, is not readily or accurately determined from such data, because the shapes and sizes of pits are such as to provide irregular sonic returns that are difficult, if not impossible, to interpret with confidence as to pit existance and dimensions.

SUMMARY OF THE INVENTION

With the foregoing in mind, it is a principal object of the present invention to provide a device for convenient underwater ultrasonic inspection of ship hull plate for detecting and accuratel Another object of the invention is to provide a pit gauge device in the form of an accessory that can be used with existing hand-held ultrasonic hull inspection probes.

Still another object is to provide a device of the foregoing character that is inexpensive, rugged, easy to use and which will provide reliable and accurate data as to pit dimensions.

As yet another object, the invention aims to take advantage of the fact that the speed of sound is substantially less in water than in steel, whereby measuring the depth of pits steel plate indirectly by ultrasonically measuring a corresponding change in a water path provides greater resolution and accuracy in pit depth determination.

The invention may be further said to reside in certain novel constructions, combinations, and arrangements of parts by which pit gauge devices embodying the invention achieve the aforementioned objects and advantages, as well as others which will become apparent from the following detailed description of a presently preferred example thereof when read in conjunction with the accompanying drawings.

DESCRIPTION OF THE DRAWINGS

FIG. 1 is a side elevational view of a pit gauge device embodying the invention, and adapted for use with an ultrasonic inspection probe, a fragment of which is shown in phantom;

FIG. 2 is a plan view of the device of FIG. 1; and

FIG. 3 is an enlarged vertical sectional view of the device of FIG. 1, shown in association with a fragmentary portion of an ultrasonic inspection probe.

DESCRIPTION OF THE PREFERRED EMBODIMENT

In the exemplary form of the invention illustrated in the drawings and described hereinafter, a pit gage device 10 serves as an accessory adapted for use with an existing ultrasonic hull inspection probe 12. The gauge device 10 comprises a first tubular body 14 conveniently formed of a rigid plastic or other non-corrosive material. The body 14 is conveniently in the form of a right cylinder and has a central bore 16. An axially extending opening or slot 18 is formed in the body 14 to accommodate an axially movable stylus 20.

One end of the body 14 is substantially closed by a plate 22 secured to the body by screws 24 and presenting outer and inner plane surfaces 26 and 28, respectively. The plate 22, which serves as a hull contacting element and a sonic energy reflector, is conveniently made of a durable and corrosion resistant metal such as stainless steel. It will be noted that the plate 22 has a notch 22a in the periphery thereof that is in registration with the slot 18 in the wall of body 14.

A second, generally tubular body 30, the tubular portion of which is of smaller diameter than the body 14, is telescopically and reciprocally received in the bore 16 of the body 14 and has a central bore 32. The body 30 is provided with an end wall 34 remote from the plate 22, and a radial flange 36 extending outwardly substantially to the outer diameter of the body 14. The body 30, including the end wall 34 and flange 36, is conveniently formed as an integral structure of a rigid plastic material. A central aperture or port 40 is formed in the end wall 34 and is defined in part by a surrounding annular boss 42 extending outwardly of the end wall. Openings 44 in the body 30 are provided to permit the interior of the device 10 to freely flood when submerged.

The stylus 20, which has a pointed end 20a adapted to be extended and retracted relative to the surface 26 of plate 22, is carried on one end of a shaft or rod 46 that extends slidingly through a guide bore 48 in the wall of body 14. The rod 46 has its other end extending through an opening 50 in flange 36, and fixed therein relative to the body 30 by a stop flange or collar 52 and nut 54.

A helical compression spring 60 is contained in the chamber 62 defined by the body 14, plate 22, and body 30, the spring acting against the inner surfaces of the plate 22 and the end wall 34 to resiliently urge the body 30 in a direction outwardly of the body 14. Outward movement of the bodies 30, 14 relative to one another is limited by a bolt or post 66 extending through a guide opening 68 in flange 36 and threadedly fixed at 70 in the wall of body 14. The post 66 is provided with a head 66a that cooperates with the flange 36 as a limit stop. Inward movement of the body 30 relative to the body 14 is limited by engagement of the edge 30a of the former with the plate 22. The range of movement is such that when the bodies are extended so that flange 36 engages head 66a, the point 20a of the stylus 20 is withdrawn to or inwardly of the plane of surface 26 of plate 22, and when the bodies are compressed until edge 30a engages plate 22, the stylus 20 projects outwardly of surface 26 by an amount sufficient to reach the bottom of the deepest pits expected to be encountered.

The device 10 is adapted to be fixed to the barrel 70 of a ultrasonic probe 12 by means of screws 72 extending through wall 34, with the boss 42 extending into the barrel. In this example, the probe 12 comprises an inner sleeve 74 that is movable within the barrel 70 into engagement with the boss 42, the sleeve carrying an ultrasonic transducer 76. The transducer 76 transmits or projects a beam of ultrasonic energy, represented by arrow 80, through the aperture or port 40 and water-filled chamber 62 to the inner surface 28 of the plate 22. Such energy is partly reflected by that surface, as represented by arrow 82, so as to return through the port 40 to the transducer.

In use, a diver presses the device against the structure 84 to be inspected so that the reflecting plate 22 follows the surface 86 thereof, while the stylus 20 is allowed to engage in corrosion pits such as 88. It will be recognized, of course, that movements of the stylus into a pit 88 will establish a corresponding distance between the transducer and the reflecting surface 28. That distance will result in the transducer 76 receiving reflected acoustic energy, the travel time of which is readily detected by processing of corresponding electrical signals in a manner well known to those skilled in the art of ultrasonic measurements to produce resulting pit depth related signals which can be displayed and/or recorded, either in analog or digital form. The device 10 can be readily calibrated for use by engaging the stylus in recesses accurately machined into a calibration plate to predetermined depths, and recording the resulting ultrasonic measurements for comparison to the actual inspection results.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A pit depth gauge device for use with an ultrasonic probe including a transducer having a transmitting and receiving face, said device comprising:
    a hollow, cup-shaped first member having a first end wall presenting an outer surface adapted to be pressed against an inspection surface and an inner, acoustically reflecting surface;
    a hollow second member telescopically mounted for axial relative movements between said members and having a second end wall in which an acoustic energy port is defined, said second adapted to be mounted on said probe with said port in registration with said transducer face;
    spring means, acting between said members, for normally urging said members to move outwardly of one another and for resiliently allowing said members to be pressed inwardly;
    a stylus, having a sharp point, fixedly mounted on said second member and movable axially therewith between retracted and extended positions relative to said outer surface of said first end wall for engagement in a pit in said inspection surface, whereby said transducer face is positioned at a distance from said reflecting surface that is related to the depth of said pit.

2. A pit depth gauge device as defined in claim 1, and wherein:
    said first and second members define a cavity between said first and second end walls, said cavity being freely flooded when said device is underwater.

3. A pit depth gauge device as defined in claim 2, and wherein:
    said first and second members comprise first and second concentric cylindrical walls, respectively;
    said stylus comprises an elongate shaft portion and a pit engaging point portion at one end of said shaft portion; and
    said first cylindrical wall being of larger diameter than said second cylindrical wall and characterized by a guide opening in which said shaft portion is received, and an axially extending slot in which said point portion is movable.

4. A pit depth gauge device as defined in claim 3, and wherein:
    said second member comprises a radially extending flange substantially congruent with said first cylindrical wall; and
    said stylus shaft portion having its end fixed to said flange.

5. A pit depth gauge device as defined in claim 4, and further comprising:
    guide and stop means, cooperable between said first and second members for limiting movement of said members outwardly of one another.

6. A pit depth gauge device as defined in claim 5, and wherein:
    said flange is characterized by a guide hole;
    said stop means comprises a shaft extending through said guide hole and fixed to said first cylindrical wall and a head on said shaft engageable by said first member when said stylus point is in said retracted position; and
    said shaft and guide opening being operative to prevent rotation of said first and second members relative to one another.

7. A pit depth gauge device as defined in claim 6, and wherein:
    said first cylindrical wall of said first member is formed of a substantially rigid synthetic plastic material;
    said first end wall is formed of a corrosion resistant metal; and
    said second member is formed of a substantially rigid synthetic plastic material.

8. A pit depth gauge device as defined in claim 7, and wherein:
    said second end wall is characterized by an annular boss extending axially outwardly therefrom about said port, said boss presenting an edge adapted to be engaged by said transducer.

* * * * *